(12) United States Patent
Poslinski

(10) Patent No.: US 8,054,854 B2
(45) Date of Patent: Nov. 8, 2011

(54) NETWORK REMOTE CONTROL

(75) Inventor: Thomas Poslinski, Elma, NY (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1018 days.

(21) Appl. No.: 10/926,920

(22) Filed: Aug. 26, 2004

(65) Prior Publication Data

US 2006/0048194 A1    Mar. 2, 2006

(51) Int. Cl.
*H04J 3/22* (2006.01)
*G06F 13/00* (2006.01)

(52) U.S. Cl. .................. 370/465; 348/14.05; 725/47

(58) Field of Classification Search .................. 370/310, 370/339, 464–467; 348/14.05, 734; 725/37, 725/39, 47, 48, 40, 59, 80, 141; 709/217–219, 709/227; 340/825.22, 825.69, 825.72; 715/259, 715/744, 745; 345/335
See application file for complete search history.

(56) References Cited

U.S. PATENT DOCUMENTS

| | | | | |
|---|---|---|---|---|
| 5,410,326 A * | 4/1995 | Goldstein | | 348/734 |
| 5,475,835 A * | 12/1995 | Hickey | | 725/39 |
| 5,706,290 A * | 1/1998 | Shaw et al. | | 370/465 |
| 5,710,605 A * | 1/1998 | Nelson | | 348/734 |
| 5,959,539 A * | 9/1999 | Adolph et al. | | 340/3.5 |
| 6,091,886 A | 7/2000 | Abecassis | | |
| RE37,000 E | 12/2000 | Shinyagaito et al. | | |
| 6,177,931 B1 | 1/2001 | Alexander et al. | | |
| 6,259,443 B1 | 7/2001 | Williams, Jr. | | |
| 6,297,746 B1 * | 10/2001 | Nakazawa et al. | | 340/825.69 |
| 6,331,813 B1 * | 12/2001 | Belliveau | | 340/310.11 |
| 6,359,636 B1 * | 3/2002 | Schindler et al. | | 715/846 |
| 6,407,779 B1 | 6/2002 | Herz | | |
| 6,564,005 B1 | 5/2003 | Berstis | | |
| 6,748,596 B2 | 6/2004 | Knudson et al. | | |
| 6,914,888 B1 * | 7/2005 | Iselt | | 370/310 |
| 6,998,955 B2 * | 2/2006 | Ballew et al. | | 340/5.1 |
| 7,136,709 B2 * | 11/2006 | Arling et al. | | 700/65 |
| 7,296,079 B2 * | 11/2007 | Motoyama et al. | | 709/230 |
| 7,693,935 B2 * | 4/2010 | Weber et al. | | 709/203 |
| 2002/0044225 A1 | 4/2002 | Rakib | | |
| 2004/0119894 A1 * | 6/2004 | Higgins et al. | | 348/734 |
| 2004/0203387 A1 * | 10/2004 | Grannan | | 455/41.2 |
| 2004/0210933 A1 * | 10/2004 | Dresti et al. | | 725/40 |
| 2005/0235329 A1 * | 10/2005 | Karaoguz et al. | | 725/81 |
| 2006/0045107 A1 * | 3/2006 | Kucenas et al. | | 370/401 |
| 2006/0168618 A1 * | 7/2006 | Choi | | 725/37 |
| 2007/0244745 A1 * | 10/2007 | Boal | | 705/14 |

FOREIGN PATENT DOCUMENTS

| | | |
|---|---|---|
| EP | 917064 A1 * | 5/1999 |
| WO | WO 01/67670 * | 9/2001 |
| WO | WO 01/95283 * | 12/2001 |

* cited by examiner

*Primary Examiner* — Aung S Moe
*Assistant Examiner* — Kerri Rose
(74) *Attorney, Agent, or Firm* — Rader, Fishman & Grauer PLLC

(57) ABSTRACT

A network of devices with remote control includes a network interconnecting two or more networked devices and a wireless remote control unit for communicating with one or more of the networked devices. The remote control unit stores an interface for one or more of the networked devices so that the networked devices can be controlled with the remote control unit.

30 Claims, 6 Drawing Sheets

NETWORK REMOTE CONTROL

BACKGROUND

Many modern devices can be controlled with a remote control unit. For example, television sets, video cassette recorders and stereo/audio systems typically come with a remote control unit that can be used to control that device from a distance.

Typically a remote control unit is a unidirectional, point-to-point communications device for transmitting user input to the device being controlled. Many remote control units operate using an infra-red signal to transmit user input to the device being controlled. This generally requires a line-of-sight between the remote control unit and the controlled device. Some remote control units signal the device controlled with a radio frequency (RF) signal. This allows the remote control unit to signal and control the device without being in view of the device.

Each remote control unit has a specific, fixed protocol that is used to communicate with the device being controlled. The protocol is defined and programmed into the remote control unit and the controlled device by the manufacturer. This is done so that multiple remote controls can be used simultaneously to control multiple devices, with the signal from each remote control unit being recognized and used only by the device built to communicate with that remote control unit.

Some remote control units are designed to support multiple communication protocols so as to be able to control multiple devices, even devices from different manufacturers. Such remote control units are programmed with a variety of different communication protocols. The protocol being used by the remote control unit can then be switched using controls on the remote control unit itself. In this way, the user can selectively operate the remote control unit to send commands to a number of different controlled devices.

SUMMARY

A network of devices with remote control includes a network interconnecting two or more networked devices and a wireless remote control unit for communicating with one or more of the networked devices. The remote control unit stores an interface for one or more of the networked devices so that the networked devices can be controlled with the remote control unit.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

According to principles described herein, a network is implemented among various devices in a particular environment, for example, a residence or office suite. The network can be a wired or wireless network. A remote control unit is described that controls the various devices connected to the network. The remote control unit may transmit commands directed to a particular networked device or may send the commands for that device through the network to the device being controlled.

Figure 1:
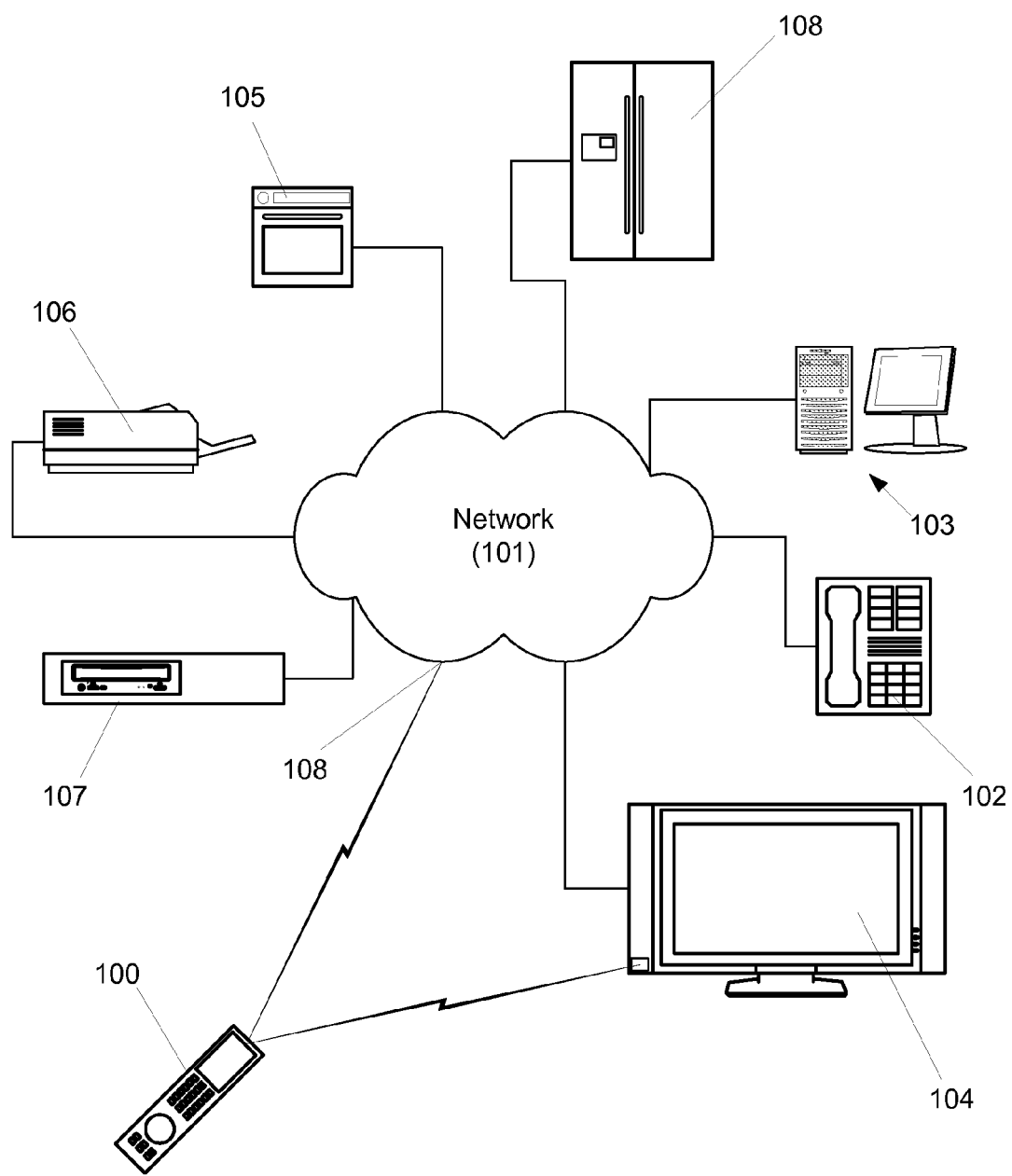
FIG. 1 is a diagram of an exemplary network and remote control unit for networked devices according to principles described herein.

FIG. 1 is a diagram of an exemplary network and remote control unit for networked devices according to principles described herein. As shown in FIG. 1, a network (101) is implemented to create connections among a variety of different device in a particular environment. This may be any environment, for example, a home, apartment, office suite, office building, etc.

As indicated above, the network (101) may be a wired or wireless network. Any network can be used that provides communication among the various networked devices.

A wide variety of devices can be connected to the network (101). In the illustrated example, the network includes a television set (104), a telephone (102), a computer (103), a refrigerator (108), an oven or stove (105), a printer (106) and an audio/video system component (107), which could be, for example, a receiver, a tuner, a Digital Video Disk (DVD) player, a Video Cassette Recorder (VCR), a Compact Disc (CD) player or the like. Generally, networked devices can be, for example, appliances, electronics, etc., any electrical device.

As will be understood by those skilled in the art, these are merely examples of the devices that could be connected to the network (101). Any device in a particular environment, which a user might want to communicate with from a remote location, can be given network capability and connected to the network (101).

A remote control unit (100) is also used with the network. As will be described herein, the remote control unit (100) has the capability to send commands to and control any of the devices on the network (101).

As shown in FIG. 1, the remote control unit (100) may send commands directly to a particular network device to control that device. Alternatively, the remote control unit (100) may send a command for a first networked device to another second networked device. The second networked device will transmit the command, over the network (101), to the first, target device. The network (101) may also have one or more transceivers (108) connected to the network (101) for the sole purpose of receiving commands from the remote control unit (100) for various devices on the network. Each device on the network (101), including the remote control unit (100) will have an address, such as an IP address, so that communications can be routed throughout the network to addressed recipient devices.

For example, a user may be in one room operating the computer (103) when the need to print a document arises. If the printer (106) is turned off and located in another room, the user can use the remote control (100) to turn on the printer (106) and prepare for printing without leaving the computer (103). The printer (106) can also send status messages to the remote control unit (100), such as that the printer is low on toner or out of paper, etc.

In another example, the user is watching the television (104), but wants to preheat the oven (105). The user can accordingly operate the remote control unit (100) to signal the oven (105) to turn on and to preheat to a specified temperature. The user can then continue watching television (104) while the oven preheats.

In another example, the user may want to adjust the settings for the refrigerator (108). Typically, such controls are located at the back of the refrigerator or freezer compartment and may be difficult to access. In the example of FIG. 1, the user can simply operate the remote control unit (100) to adjust the temperature settings in the various compartments of the refrigerator (108), initiate energy saving modes, etc. The refrigerator (108) may also send status data to the remote control unit (100) such as the temperature in the various compartments, energy usage data or items that need to be corrected, such as a burned out light bulb. All the devices on the network may be programmed to use a universal exchange protocol.

Figure 2:
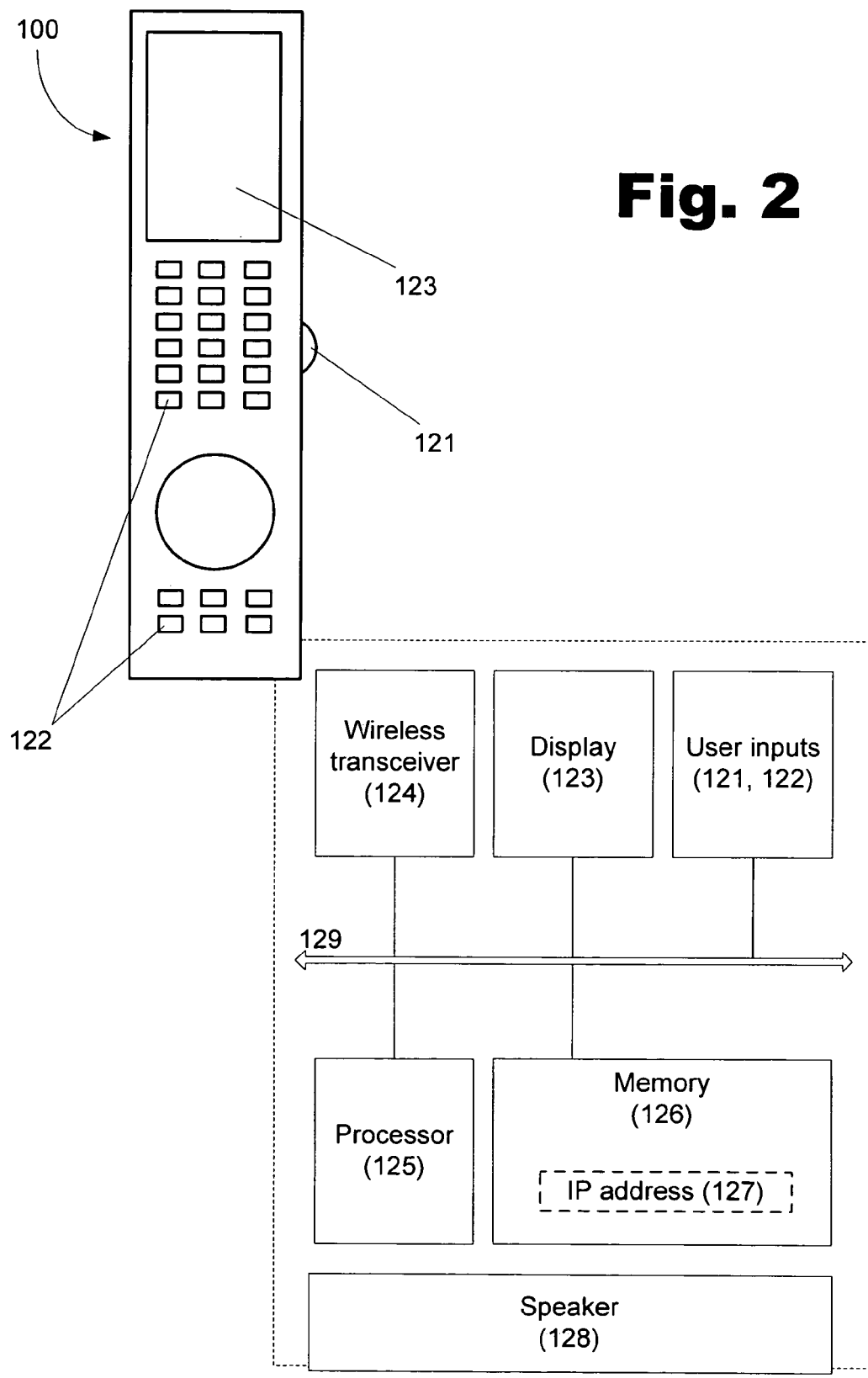
FIG. 2 is a diagram of an exemplary network remote control unit according to principles described herein.

FIG. 2 is a diagram of an exemplary network remote control unit according to principles described herein. As shown in FIG. 2, the remote control unit (100) has a number of user input devices for receiving user input. The user input devices include a number of keys or buttons (122) that may be assigned to issue particular commands or signals when activated.

Additionally, the remote control unit (100) may have a display device (123). This display device (123) may be, for example, a liquid crystal display (LCD) device or some other flat panel display device. In some embodiments, the display device (123) is touch-sensitive and can be used as another user input device. "Soft" buttons can be displayed on the display device (123), which are then activated by pressing the area over which the button is displayed on the touch-sensitive screen.

The display device (123) can be used to display a user interface that is specific to each of the various networked devices. This will be described in more detail below. If communication with a networked device is ever lost, an error message can be displayed on the remote control unit (100). The user can then check the operation of that device and its network connections to rectify the problem.

The remote control unit (100) may also include a jog dial (121) or other knob, dial or the like. The jog dial (121) can be used to switch the remote control unit (100) to control different networked devices. For example, by rotating the jog dial (121), the remote control unit (100) will switch from an interface for the television set (104, FIG. 1) to an interface for the DVD player (107, FIG. 1) and will start addressing user input transmissions to the DVD player.

The lower right-hand portion of FIG. 2 illustrates principal internal components of the remote control unit (100). As shown in FIG. 2, the remote control unit (100) includes a wireless transceiver (124) for communicating with the network (101, FIG. 1) and the various networked devices. Some, but not necessarily all, of the networked devices will include corresponding wireless transceivers for communicating with the remote control unit (100). Some networked devices may rely on communicating with the remote control unit through the network and not directly. Such a device may have a network connection, but not a wireless transceiver.

The wireless transceiver (124) can use any wireless signaling scheme. For example, the transceiver (124) may be an infra-red or radio frequency (RF) transceiver.

The remote control unit (100) also includes a processor (125) and a memory unit (126). As will be described in more detail below, the memory unit (126) may be supplemented by a removable memory card or stick. The memory (126) includes all the programming executed by the processor (125) to provide the remote control unit (100) with all the functionality described in this specification.

The memory (126) will also include a network address, such as an IP address (127), at which the remote control unit (100) is accessed on the network (101, FIG. 1). With the IP address (127), message or communications on the network for the remote control unit can be routed and received by the remote control unit (100).

The remote control unit (100), in some embodiments, may also include a speaker (128) for outputting sounds as part of a user interface. A system bus (129) interconnects the various components of the remote control unit (100).

Figure 3:
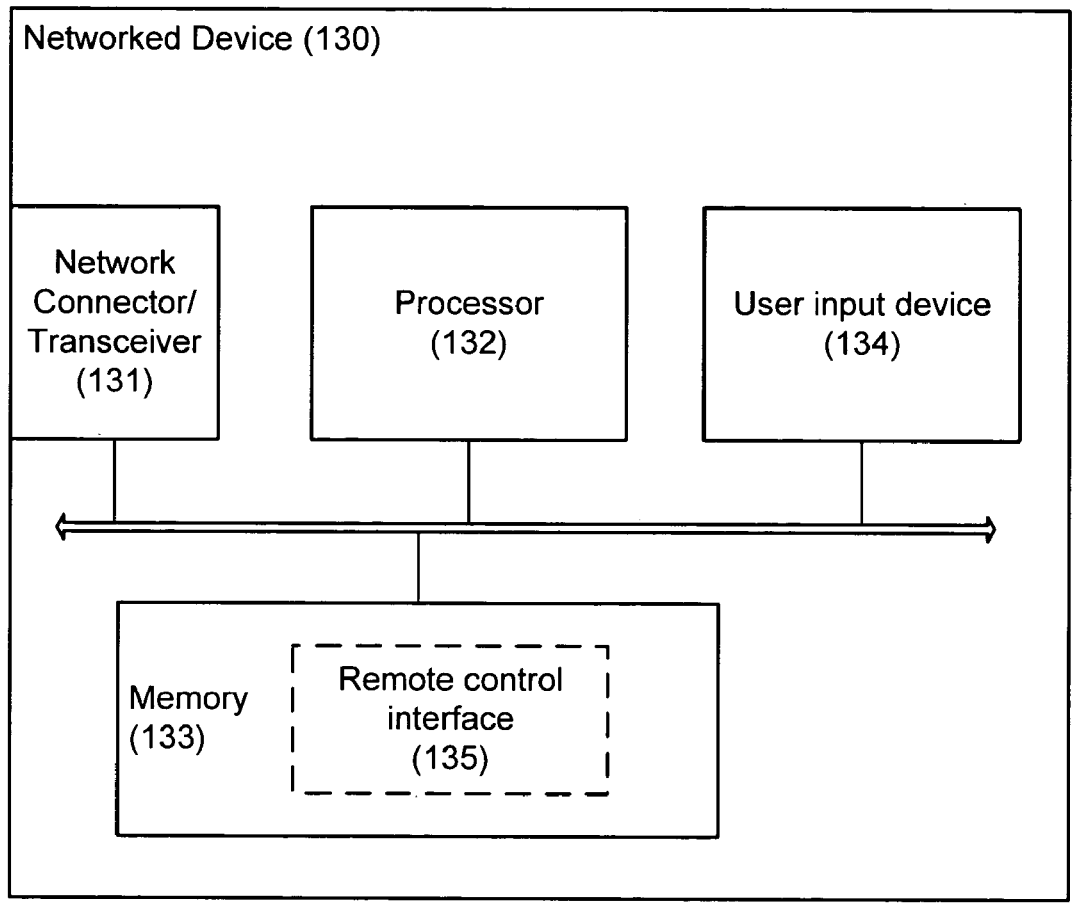
FIG. 3 is a diagram of an exemplary networked device according to principles described herein.

FIG. 3 is a diagram of an exemplary networked device according to principles described herein. As shown in FIG. 3, a typical networked device (130) will include a processor (132) and a memory (133). The memory (133) includes all the programming executed by the processor (132) to provide the networked device (130) with all the functionality described in this specification.

The networked device (130) also includes a network connector/transceiver (131). In a wired network (101, FIG. 1), the network connector/transceiver (131) may be a connector that physically connects to a network cable. In a wired network (101, FIG. 1), the network connector/transceiver (131) may be a transceiver that communicates wireless with the network (101, FIG. 1). Some networked devices (130) may include both a network connector and a transceiver so as to be operable with both wired and wireless networks.

In some embodiments, the networked device (130) may include a user input device (134) such as a keypad, a keyboard, buttons, dials, knobs, a display, a touch-sensitive display or a combination of such devices. The user input device (134) may be used to receive input controlling the device (130). The user input device (134) may also be used to input user preferences.

The memory (133) also includes a remote control interface (135). This is an electronic interface that can be transmitted from the networked device (130) to the remote control unit (100, FIG. 1).

The interface (135) will provide the remote control unit (100, FIG. 1) with the functions that can be performed by or controlled on the networked device (130). For example, the interface (135) may assign particular functions to the keys (122, FIG. 2) on the remote control (100, FIG. 2). Additionally or alternatively, the interface (135) may include a number of soft buttons or user interface screens that can be displayed on the display device (123, FIG. 2) of the remote control unit (100, FIG. 2). These user interface screens may include graphics or animation sequences to facilitate the user's understanding of, and interaction with, the networked device (130). In short, the interface (135) provides all the data, display, communication protocols, etc. for the user to be able to use the remote control unit (100, FIG. 1) to interact with and control the networked device (130).

Figure 4:
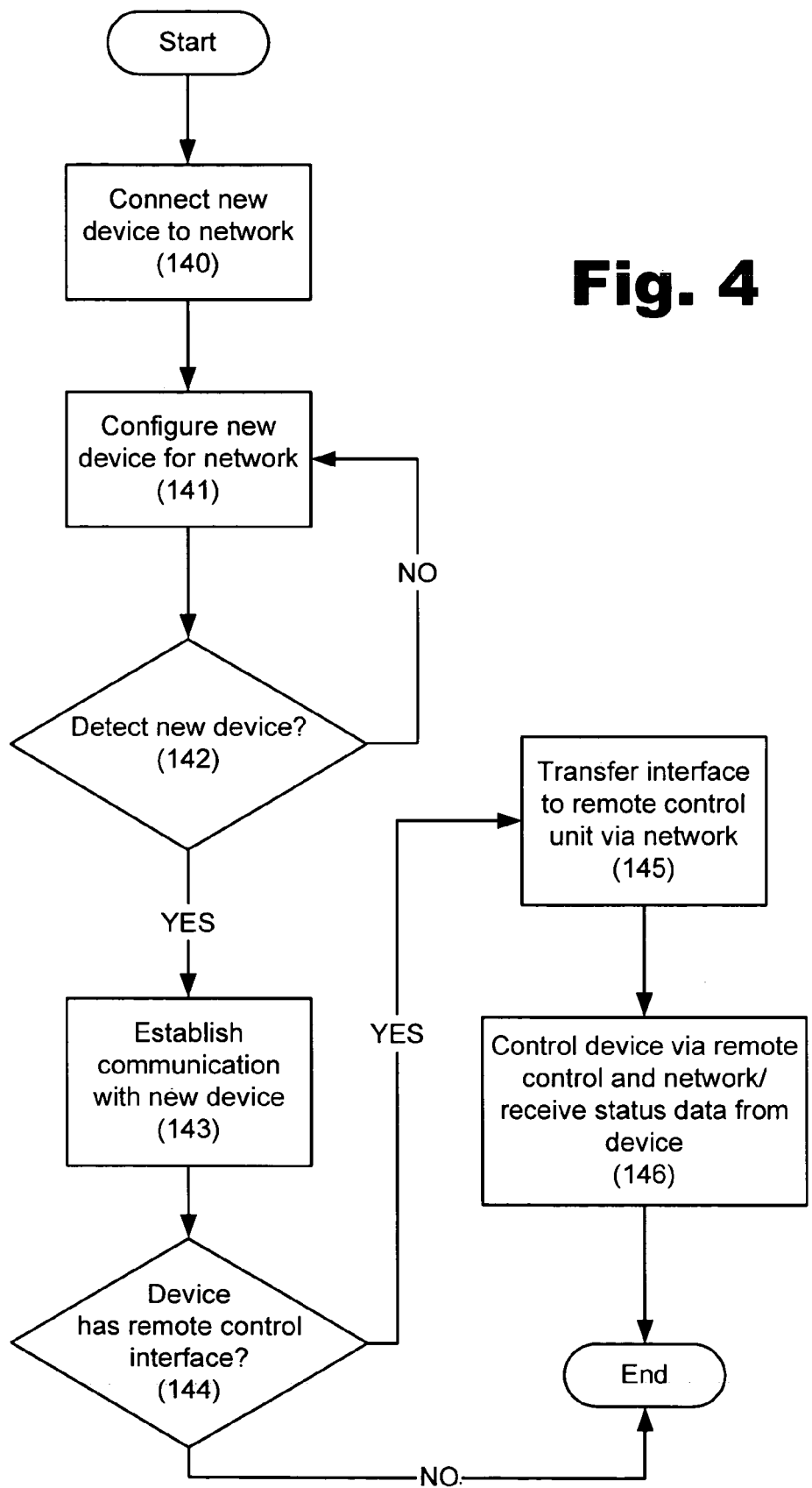
FIG. 4 is a flowchart illustrating an exemplary method of controlling networked devices with a remote control unit according to principles described herein.

FIG. 4 is a flowchart illustrating an exemplary method of controlling networked devices with a remote control unit according to principles described herein. As shown in FIG. 4, the process begins when a new device is connected to the network (140). The networked device is configured (step 141) on the network by assigning a network address to the device so that communications can be directed to the device. The networked device will also be configured by receiving the network address of the remote control unit (100, FIG. 1) so that the new networked device can communicate with the remote control unit.

During subsequent operation, a networked device may receive a communication not addressed to that device, directly from the remote control unit, for example. In such a case, the device is programmed to pass the communication on to a network router for delivery to the addressed device or to send the communication directly to the addressed device via the network.

After the new device is configured on the network, communication is then established between the remote control unit and the new networked device. This may result from the newly-configured device signaling the remote control unit. Alternatively, the remote control unit may detect that a new device has been connected to the network (determination 142) and may query that device.

Once communication is established (step 143) between the new device and the remote control unit, the remote control unit will determine if the new networked device has a remote control interface (determination 144). If so, the interface for that new networked device is transmitted to the remote control unit (step 145).

The interface for each of the devices on the network is stored in the memory (126) of the remote control unit (100). Consequently, when the user desires to control a particular networked device, the user can select that device on the remote control unit. The remote control unit then uses the interface for that networked device to facilitate user understanding and control of that networked device. Input from the user can then be transmitted from the remote control unit to the controlled device (step 146). Additionally, status information, such as error messages or operating parameters, can be received from the networked device and displayed for the user on the remote control unit.

User preferences are an important part of most device configurations. Many devices can be configured to operate in a particular fashion as most desired by a user. User preferences can control the look and/or feel of a device to the user so that the device best meets the needs and desires of the user.

After a user inputs user preference settings, the storage of user preferences is typically in non-volatile memory on the device itself. Some devices allow for plug-in non-volatile memory for the storage of user preference settings. However, a user is then required to insert a memory module directly into the device. If the device is stored in a cabinet, the exchange of a memory module for storing user preference settings may become inconvenient.

Figure 5:
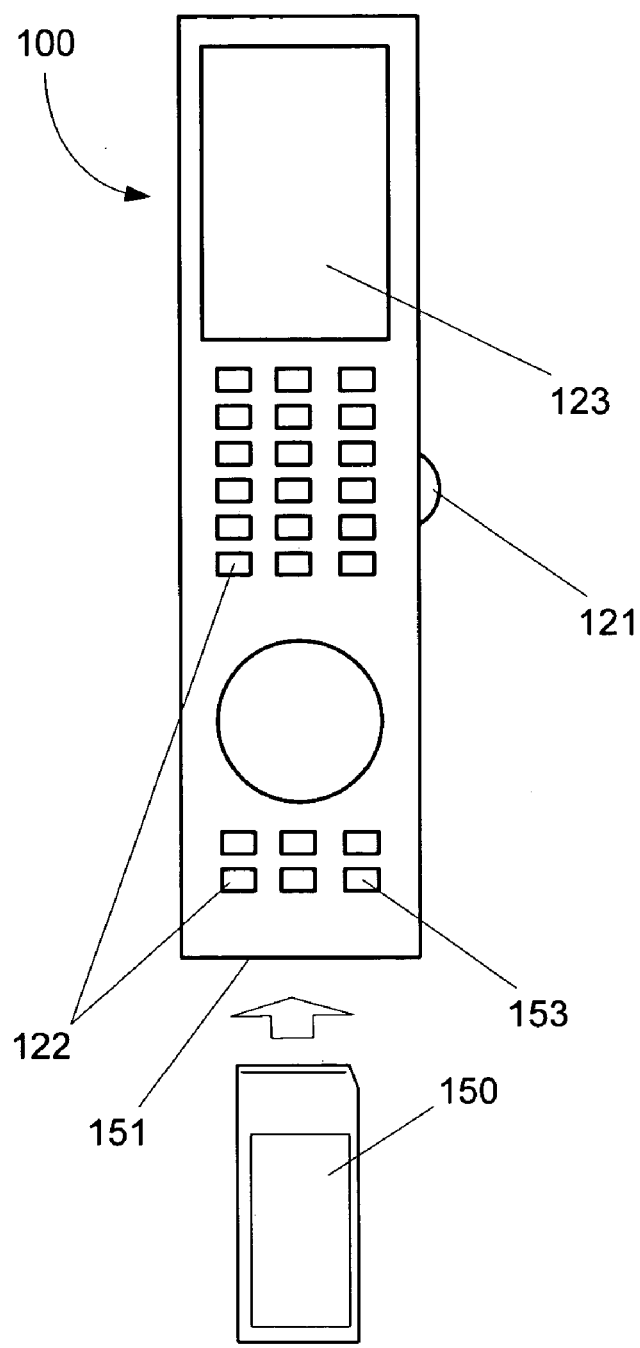
FIG. 5 is an illustration of another exemplary remote control unit according to principles described herein.

FIG. 5 is an illustration of another exemplary remote control unit according to principles described herein. As shown in FIG. 5, the remote control unit (100) may include a memory card slot (151) for receiving a memory module (150). The memory module (150) may be non-volatile memory, such as Flash memory and may be a memory card, chip or stick.

This memory module (150) may replace or supplement the memory (126, FIG. 2) of the remote control unit (100, FIG. 2). The memory module (150) can also be used to store in one central location the user preference settings or user preference data for all of the networked devices that support specified user preferences.

The memory module (150) is then easily extracted from the remote control unit (100) if, for example, the user wants to transport their preferences to another network or for some other reason. In the illustrated embodiment, the slot or port (151) for the memory module (150) is located at the bottom end of the remote control unit (100) so that the module will not interfere with operation or handling of the remote control unit (100).

The remote control unit (100) of FIG. 5 may also include a button for updating or storing user preference data. This button may be a dedicated hard button (153) or a soft button on the display (123). This button and its function will be described in more detail below. The button (153) may cause an update of user preference settings only for the networked device to which the remote control (100) is then set, or may cause a general updating of user preference data for all networked devices.

As described above, user preference setting or data for any networked device can be centrally stored on the network remote control unit described herein. This user preference data may be stored on the removable memory module described with reference to FIG. 5 or may be stored in the non-removable memory in the remote control unit.

Figure 6:
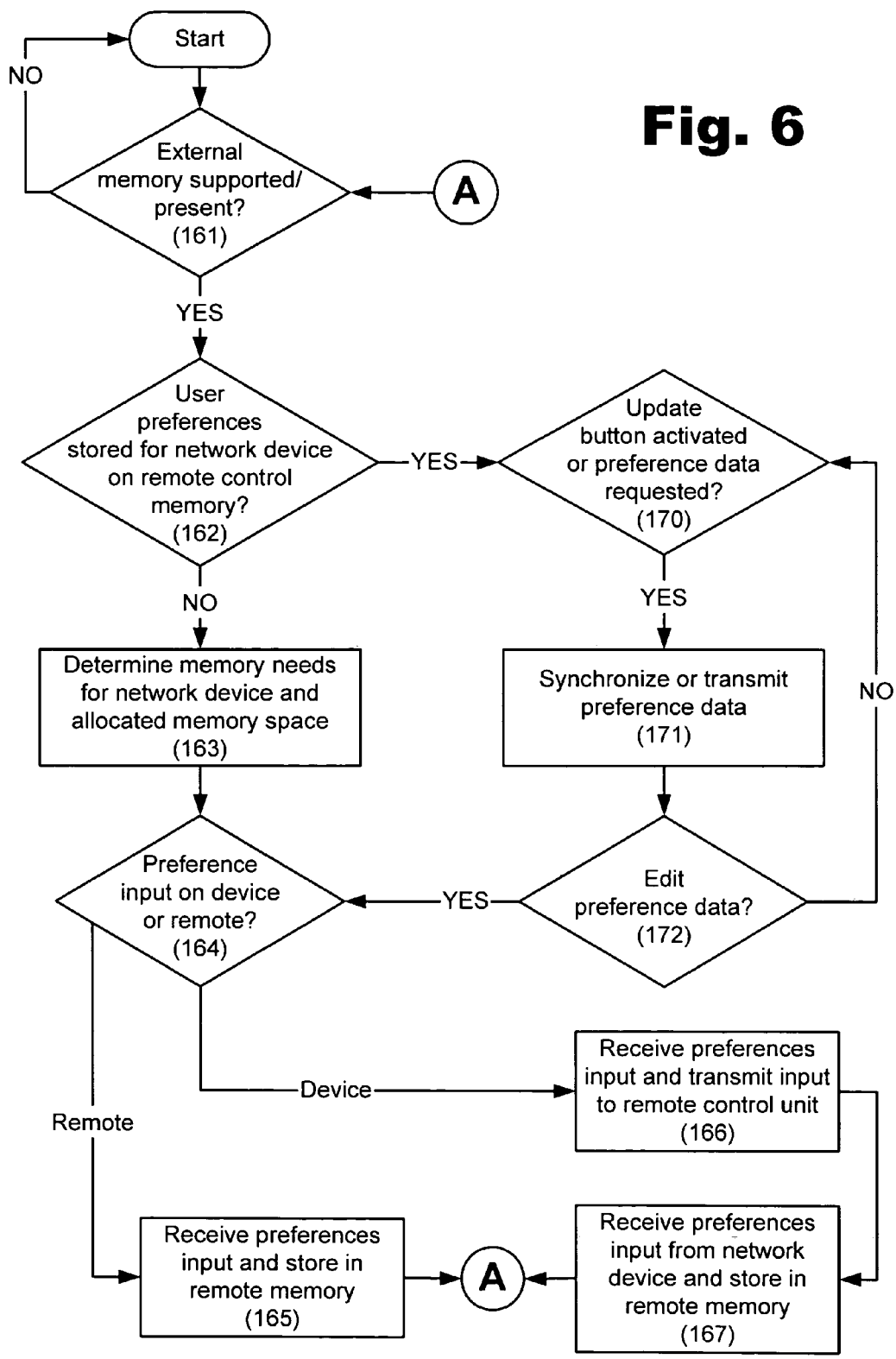
FIG. 6 is a flowchart illustrating an exemplary method of storing user preferences with the remote control unit of FIG. 5 according to principles described herein.

FIG. 6 is a flowchart illustrating an exemplary method of storing user preferences in the remote control unit of FIG. 5 according to principles described herein. As shown in FIG. 6, the networked device may first determine, through communication with the remote control unit, whether external memory is support and/or present in the remote control unit (determination 161). This means that a determination is made whether the remote control unit will accept and store user preference data for the networked device and, if that storage is on a removable memory module, whether that module is present and available in the remote control unit.

If the remote control unit is able to serve as external memory for the networked device to store user preference settings for the networked device, a determination may then be made whether any user preference data is already stored for the networked device in the remote control unit (determination 162). If not, memory space can be allocated in the remote control unit, for example, on a removable memory module, to store the user preference data for that networked device (step 163). The networked device may advise the remote control unit as to the amount of memory needed for storing user preference settings or that device. Alternatively, the remote control unit may include a look-up table specifying the quantity of memory that should be allocated for user preference data for various supported networked devices. In either case, the amount of memory needed for storage of user preference data for the networked device in question is determined and then, if available, allocated within the memory of the remote control unit, including removable memory.

User preference settings can be entered either on the remote control unit or into the networked device itself (determination 164). The interface on the remote control unit for a particular network device may include controls for specifying user preferences. Accordingly, user preference settings can be entered into the remote control unit (step 165) and stored in the memory of the remote control unit. These user settings may then be implemented entirely on the remote control unit and the way the remote control unit represents the corresponding networked device or may be transmitted in whole or in part to the networked device itself to subsequently govern operation of that device.

Alternatively, the user preference data or settings can be entered directly into the controlled device itself (step 166). The user preference data may then be stored on that controlled device and/or transmitted in whole or in part to the remote control unit for storage in the remote control unit memory (step 167).

Once user preference settings are stored on the remote control unit for a particular networked device, those preferences can be transmitted to the controlled device as needed or requested. In some cases, the storage of the user preference settings on the remote control may be as a backup to the same settings stored on the corresponding device. In other cases, the remote control unit may be the primary or sole storage of the user preference settings for a particular networked device and may need to transmit those preference settings to the networked device on a regular basis, such as whenever that networked device is powered up.

Additionally, the user preferences may be periodically edited or updated. As noted above, the remote control unit may have a button for causing the user preferences to be edited or updated. When this button is activated (determination 170), the remote control unit may transmit user preference data to the networked device and/or receive user preference data from the networked device (step 171). This may be done for all devices or for a particular networked device, such as the particular networked device that the remote control unit is set to control when the update button is activated.

In this way, user preference settings may be updated and synchronized. For example, the user may have input user preference settings or changes to the user preference settings using the remote control, using the user input device of that particular networked device or both. During the update, all the changes made to the user preference settings will be collected and synchronized. If inconsistent changes have been made to the settings, the user can be prompted to clarify or input the desired user preference setting.

After this synchronization of user input data, the remote control unit may the query the user as to whether further edits to the user preference data are desired (determination 172). If the user wants to further edit the user preference data or settings (determination 172), the user can then choose to edit the user preference data via either the remote control unit or the controlled device itself (determination 164).

The preceding description has been presented only to illustrate and describe embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A remote control unit comprising:
    a transceiver configured to receive a plurality of interfaces from networked devices, said plurality of interfaces being stored in a memory module to become stored interfaces;
    a display device connected to said system bus, said display device displaying user interface screens,
    wherein said one of the stored interfaces is used to generate one of the user interface screens,
    a processor configured to generate a command, one of the stored interfaces extracted from said memory module being used to generate said command,
    wherein said command instructs an electrical device to perform or control a function, said electrical device being one of the networked devices,
    wherein a network interconnects with each of said networked devices, said networked devices being end devices connected to the network, and
    wherein said command is initiated from the remote control unit responsive to selection based upon said one of the user interface screens and is sent through a different one of the networked devices to said electrical device.

2. The remote control unit according to claim 1, wherein said one of the stored interfaces includes data for a plurality of device functions that are performable or controllable by said electrical device, said function being one of the device functions.

3. The remote control unit according to claim 1, wherein said one of the stored interfaces includes data for user preference settings, said user preference settings being input into said electrical device.

4. The remote control unit according to claim 3, wherein said user preference settings are editable by a user.

5. The remote control unit according to claim 1, wherein said memory module is removable from a memory card slot.

6. The remote control unit according to claim 1, wherein said one of the stored interfaces extracted from said memory module is used to generate a sound from a speaker.

7. The remote control unit according to claim 1, wherein said remote control unit is assigned a remote control unit network address, said remote control unit network address uniquely identifying said remote control unit on said network.

8. The remote control unit according to claim 1, wherein said transceiver wirelessly communicates with said network.

9. The remote control unit according to claim 1, wherein said transceiver communicates with said network by wire.

10. The remote control unit according to claim 1, wherein said each of the networked devices is individually addressable, said each of the networked devices being uniquely identifiable on said network.

11. The remote control unit according to claim 10, wherein said each of the networked devices is assigned a device network address.

12. The remote control unit according to claim 1, wherein a particular one of the user interface screens is selectable.

13. The remote control unit according to claim 1, wherein said display device is touch-sensitive display device, said user interface screens including one or more soft buttons.

14. The remote control unit according to claim 1, wherein another of the interfaces is from another of the networked devices, said another the interfaces being used to generate another of the user interface screens.

15. The remote control unit according to claim 14, wherein another command controls said another of the networked devices, another of the stored interfaces extracted from said memory module being used to generate said another command.

16. An electrical device comprising:
    a network connector/transceiver configured to output an interface onto a network, said interface including a plurality of device functions;
    a processor configured to execute a command to perform or control a function, said function being one of the device functions,
    wherein said network connector/transceiver receives said command originating from a remote control unit,
    said remote control unit using a stored interface to generate said command through a remote control display that displays user interface screens, wherein the stored interface is used to generate one of the user interface screens,
    wherein the electrical device is one of a plurality of networked devices interconnected by a network, said networked devices being end devices connected to the network, and
    wherein said command is initiated from the remote control unit responsive to selection based upon said one of the user interface screens and is received by the electrical device through a different one of the networked devices.

17. The electrical device according to claim 16, wherein said electrical device is an appliance.

18. The electrical device according to claim 16, wherein said electrical device is electronics.

19. The electrical device according to claim 16, wherein said interface includes user preference settings, said user preference settings being input into said electrical device.

20. The electrical device according to claim 19, wherein said user preference settings are editable by a user.

21. The electrical device according to claim 16, wherein said network connector/transceiver wirelessly communicates with said network.

22. The electrical device according to claim 16, wherein said network connector/transceiver communicates with said network by wire.

23. The electrical device according to claim 16, wherein a plurality of device interfaces from networked devices are downloadable onto said network, said interface being one of the device interfaces.

24. The electrical device according to claim 16, wherein said each of the networked devices is assigned a device network address.

25. The electrical device according to claim 16, wherein said each of the networked devices is individually addressable, said each of the networked devices is individually addressable, said each of the networked devices being uniquely identifiable on said network.

26. The electrical device according to claim 16, wherein a particular one of the user interface screens is selectable.

27. The electrical device according to claim 16, wherein said display device is touch-sensitive display device, said user interface screens including one or more soft buttons.

28. The electrical device according to claim 16, wherein said transceiver receives another interface from another of the networked devices, said another interface being used to generate another of the user interface screens.

29. The electrical device according to claim 28, wherein said another interface is another of the device interfaces.

30. The electrical device according to claim 28, wherein another command output from said transceiver controls said another of the networked devices, said another interface being used in controlling said another of the networked devices.

* * * * *